UNITED STATES PATENT OFFICE.

THOMAS HOLMES, OF BROOKLYN, NEW YORK.

EMBALMING-MIXTURE.

SPECIFICATION forming part of Letters Patent No. 450,017, dated April 7, 1891.

Application filed June 1, 1887. Renewed March 9, 1891. Serial No. 384,199. (No specimens.)

*To all whom it may concern:*

Be it known that I, THOMAS HOLMES, a citizen of the United States, residing at Brooklyn, in the county of Kings and State of New York, have invented certain new and useful Improvements in the Art of Embalming Corpses, of which the following is a specification.

This invention relates to materials used for the embalming or preserving dead human bodies in order to enable them to resist decomposition for a greater or less length of time.

My invention relates to the injection into the corpse of a mixture of antiseptic gases. This injection should be made into the arterial system, whereby the gases are conducted by the arteries into all parts of the body, permeating all the tissues thereof. The gases should be forced in under sufficient pressure to insure passage through the entire arterial system and penetration of the capillaries throughout the body. Thus not only are the fleshy tissues impregnated with the antiseptic, but the bony and intestinal tissues are also thoroughly impregnated. If an excessive quantity of gases are injected, the excess will escape through the capillaries and pores, leaving the proper quantity in the tissues.

To enable those skilled in the art to successfully practice my invention, I will proceed to describe in detail one method which I have employed with successful results, and which I believe to be the best adapted to ordinary cases.

I employ a gaseous mixture of about equal parts of chlorine, hydrogen, sulphurous-acid gas, and ozone. Each of these gases may be prepared in any known way—such, for example, as the following:

I prepare the chlorine by placing water, chloride of lime, and hydrochloric (muriatic) acid in a closed vessel and conduct the gas evolved therefrom into a flexible bag, preferably a rubber bag. This bag should be provided with a stop-cock at its mouth and should be capable of being connected to or disconnected from the vessel in which the gas is generated.

I prepare the hydrogen by immersing pieces of zinc in dilute hydrochloric acid in a closed vessel and conducting the resulting gas into a flexible bag or other receptacle, as before. In this reaction the zinc combines with the chlorine, forming chloride of zinc, and hydrogen is liberated.

I prepare the sulphurous acid by placing sulphur and binoxide of manganese in a closed vessel or retort and heating the latter, whereby oxygen is eliminated from the decomposition of the binoxide and unites with the sulphur. The resulting sulphurous-acid gas is confined in a rubber bag or other suitable receptacle.

I prepare the ozone by passing oxygen or atmospheric air through a tube or passage in which electric sparks are passing or in which static electricity is being discharged from a series of points, whereby the oxygen is ozonized, and I conduct the same into a suitable receptacle.

It is preferable to prepare the four gases separately and to conduct each into a separate rubber bag. The mixture of the gases may then be readily effected by connecting the four rubber bags to another larger rubber bag, either simultaneously or in succession, and by squeezing each of the smaller bags, forcing all or part of the gas contained therein into the larger bag, whereupon the stop-cock of the latter is closed and it is disconnected from the smaller bags. Thus the larger bag contains the mixed gases which have been commingled in any proportion that experience or judgment may dictate. I prefer that this bag shall have a capacity of about five gallons, which amount of gas I find sufficient for the largest and heaviest bodies or for two bodies of ordinary weight. The combined gases may be kept in this bag for a considerable time, and when it becomes necessary to use them may be conveniently carried in it to the place where the operation is to be performed.

In order to perform the operation the outlet of the bag is fitted with a pointed tube analogous to a hypodermic needle, and this pointed tube or nozzle is inserted into an artery in any convenient part of the body—as, for instance, in the wrist. The stop-cock at the mouth of the bag is then opened more or less, and by squeezing the bag the gas is forced out and injected into the artery. The pressure with which the gas is injected will depend upon the force used in compressing the bag and should be sufficient to cause the gas to flow through the entire arterial system and into the capillaries over the entire body. This result is accomplished in a short time, varying with corpses of different sizes and according to the condition of the corpse. In order to insure the thoroughness of the treatment, it is well to inject an excess of gas, which in course of time will escape, as already stated.

No other treatment of the corpse is required than the simple injection, as just described, which is performed quickly, at slight expense, and without necessitating any mutilation of the corpse and without having to remove it to any special place for treatment.

Of the substances here used in combination the sulphurous acid and hydrogen are employed as antiseptics, the chlorine and sulphurous acid are employed both as antiseptics and as bleaching substances to remove and prevent discoloration, and the ozone is employed as an antiseptic and deodorizer.

Oxygen gas may be employed in order to retard desiccation and impart a more life-like color to the corpse. I obtain this gas preferably by heating saltpeter in a closed vessel. The proportion in which the gas should be used will vary according to circumstances. Its proportion should be increased in case of subjects that have died from consumption and typhoid or other fevers. I omit its use in drowned cases or where decomposition has already set in.

The treatment of bodies for the removal of discoloration by means of gaseous bleaching agents is not herein claimed, unless such agents are at the same time antiseptics, as such treatment is made the subject of a separate application for patent filed September 30, 1887, Serial No. 251,135.

I claim as my invention the improvements in the art of embalming or preserving dead human bodies hereinabove specified, defined as follows:

A material for the preservative treatment of human corpses, composed of a gaseous mixture of sulphurous acid, chlorine, hydrogen, and ozone, substantially as set forth.

In witness whereof I have hereunto signed my name in the presence of two subscribing witnesses.

THOS. HOLMES.

Witnesses:
ARTHUR C. FRASER,
GEORGE H. FRASER.